United States Patent [19]

Pucciarello

[11] 3,997,777
[45] Dec. 14, 1976

[54] INDICATOR WITH HUB LIGHTING SYSTEM AND 360° CONCENTRIC POINTERS

[75] Inventor: Frank F. Pucciarello, Newark, N.J.

[73] Assignee: Weston Instruments, Inc., Newark, N.J.

[22] Filed: Dec. 18, 1975

[21] Appl. No.: 642,215

[52] U.S. Cl. .............................. 240/2.1; 116/129 L; 240/1 LP

[51] Int. Cl.² ........................................ G01D 11/28

[58] Field of Search .......................... 240/2.1, 1 LP; 116/129 R, 129 P, 129 L, 129 T, DIG. 5

[56] References Cited

UNITED STATES PATENTS

| | | | |
|---|---|---|---|
| 2,702,340 | 2/1955 | Thieblot | 240/2.1 |
| 2,806,132 | 9/1957 | Swanson et al. | 240/2.1 |
| 3,621,811 | 11/1971 | Hill | 116/129 R |
| 3,819,928 | 6/1974 | Kuroyama | 240/1 LP |

Primary Examiner—R. L. Moses
Attorney, Agent, or Firm—William R. Sherman; Stewart F. Moore; Kevin McMahon

[57] ABSTRACT

A hub lighted indicator suitable for aircraft applications including one or more pointers, each capable of a full 360° excursion over the dial face. The pointers include a portion which extends through a central circular aperture in the dial between the dial and the hub lighting member and are connected in a non-interfering manner to corresponding ring gears mounted for rotation coaxially with the dial aperture. The ring gears are driven in accordance with the quantities being measured to cause a corresponding excursion over the dial face of the connected pointer. Electrical connections are made to the hub lighting member from the rear portion of the indicator through the center portions of the ring gears.

10 Claims, 2 Drawing Figures

INDICATOR WITH HUB LIGHTING SYSTEM AND 360° CONCENTRIC POINTERS

The invention relates generally to indicators and more particularly to hub lighted indicators having one or more dial pointer each capable of being driven through an excursion of a full 360°.

Hub lighting is the preferred technique for illuminating the dial face of instruments particularly in some aircraft applications. In hub lighted indicators, the light source is located at the center of the dial face with the light being directed outwardly to cover a 360° area.

Known hub lighted indicators take several forms. In one arrangement, illustrated in U.S. Pat. No. 2,806,132, a pointer is disposed behind a clear dial protecting face and driven by a centrally located rotatable shaft. Electrical connection to a lamp located along the shaft axis on the dial protecting face is made via conductive members extending inwardly from the indicator perimeter across the protective face. This arrangement permits the pointer to rotate 360°, however the lamp and the conductive members severely and unacceptably obstruct the visibility of the indicator dial. Furthermore, in the arrangement taught in this patent the electrical connections must be disconnected before the dial protecting face can be removed to permit access to the bulb.

Another known hub lighting approach for an indicator with its pointer disposed as described above, however, has lamp supports and electrical connections which protrude into the path of the pointer or pointers thereby limiting their excursion to about 260°.

In view of the foregoing deficiencies of the prior art, it is an object of the invention to provide a hub lighting system for an indicator with at least one pointer having 360° rotation where visibility of the pointer and indicator dial is unobstructed.

It is another object of the invention to provide a hub lighting system for an indicator having at least one 360° rotatable pointer where visibility of the pointer is unobstructed and the lighting system is simple in design.

It is a further object of the invention to provide a hub lighting system in an indicator with at least two concentric pointers where electrical connection and support of the hub light does not interfere with 360° rotation of the pointers or visibility of the indicator dial and pointers.

In accordance with the invention, a hub lighting arrangement for an indicator positions a light source just in front of a dial having a centrally located aperture into which part of the light source extends. The indicator pointers include a portion which extend through the dial aperture between the dial and the light source and are respectively connected in a non-interfering manner to corresponding ring gears disposed behind the dial and mounted for rotation coaxially with the dial aperture. The ring gears are driven in accordance with the quantities being measured to provide a corresponding excursion of the connected pointer. Power connection to the light source is made from the rear and through the ring gears so as to avoid obstructing visibility of the dial and permit 360° excursion of the pointers.

The above mentioned and other objects, advantages and features of the invention will become more evident from the following detailed description of an exemplary embodiment taken in connection the drawings wherein:

FIG. 1 is an exploded perspective view of an illustrative embodiment of the invention; and FIG. 2 is a schematic vertical sectional view of the invention showing an alternative hub lighting arrangement.

DETAILED DESCRIPTION

Figure 1:
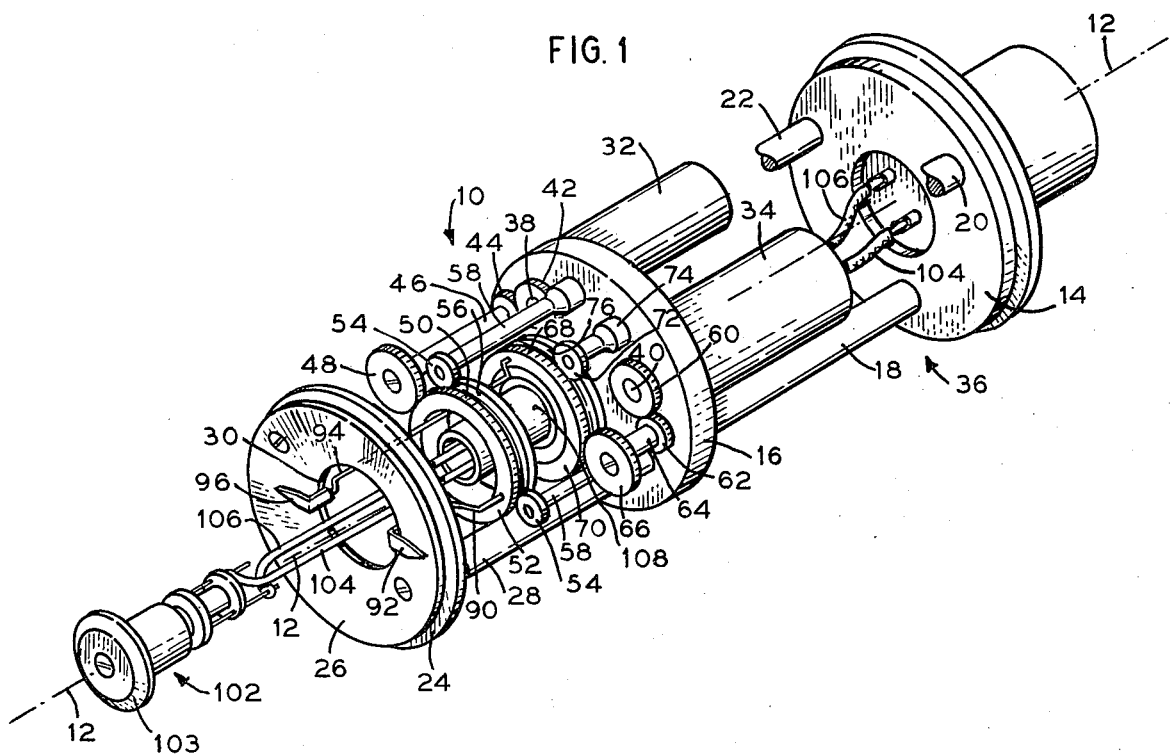

FIG. 1 is an exploded perspective view of a position indicator 10 with a hub lighting arrangement according to the invention. The indicator 10 is of substantially cylindrical construction with all of its parts arranged around a common central axis 12. A circular disk shaped base plate 14 is disposed in a plane substantially perpendicular to the axis 12 and arranged with its own central axis coincident with the axis 12. Disposed between the base plate 14 and a central mounting plate 16 are three spacer posts 18, 20 and 22 with posts 20 and 22 being shown partially cut away in order to simplify the drawing. These spacer posts 18, 20, and 22 connect the central mounting plate 16 to the base plate 14 to form a rigid assembly.

A dial mounting plate 24 with a dial 26 secured thereto is supported on three mounting posts 28 (only one being shown). Each mounting post 28 extends from the dial mounting plate 24 and attaches at its opposite end to the central mounting plate 16.

Both the dial 26 and the dial mounting plate 24 have centrally located circular apertures 30 centered on the axis 12. The aperture 30 provides a passage for other parts of the indicator which are described below.

For the illustrated embodiment of the invention, two receiver synchros 32 and 34 are disposed in the area 36 between the base plate 14 and the mounting plate 16. The receiver synchros 32 and 34 are attached to the rear side of the central mounting plate 16 and have their respective rotor shafts 38 and 40 extending therethrough. The receiver synchros 32 and 34 are electrically connected by wires (not shown) to an externally located sender synchro (not shown) and the position of each rotor shaft 38 and 40 corresponds directly to the shaft position of the connected sender synchro.

The shaft 38 has a gear 42 affixed thereon which is in driving engagement with another gear 44 mounted on a freely rotatable shaft 46. Another gear 48 is mounted on the forwardmost end of the shaft 46 and is in operative engagement with the teeth 50 on the exterior surface on a ring gear 52 which is supported for rotation about the axis 12 by three ring gear bearings 54 (only two of which are shown) which ride in a groove 56 in the exterior surface of the ring gear 52. The ring gear bearings 54 are each mounted on the forwardmost end of support posts 58 (only two of which are shown) whose rear ends are affixed to the mounting plate 16. By selecting the gear ratio for gears 42, 44, 48 and 52, one revolution of the shaft 38 can be translated into one revolution of the gear 52 which is advantageous for position indicators because the position of the gear 52 corresponds directly to the position of the shaft of a sender synchro (not shown). For other applications, the gear ratio of gears 42, 44, 48 and 52 can be different so that the ring gear 52 will revolve at a rate corresponding to the quantity being measured.

The shaft 40 has a gear 60 mounted thereon which is in driving engagement with a gear 62 mounted on a freely rotatable shaft 64. Still another gear 66 is mounted on the forwardmost end of the shaft 64 which is in operative engagement with teeth 68 on the exterior surface of another ring gear 70. The ring gear 70 is supported for rotation about the axis 12 by three ring gear bearings 72 (only one being shown) each of which ride in a groove 76 in the exterior surface of the ring gear 70 and is supported by a post 74 attached to the base plate 16. The gear ratio of gears 60, 62, 66 and 70, determine the amount of rotation for the ring gear 70 for a given rotation of the sender synchro shaft. For a position indicator the gear ratio of gears 60, 62, 66 and 70 is selected so that one revolution of the sender synchro shaft causes one revolution of the ring gear 70. Other applications of the invention may require other gear ratios for proper operation.

An alternative method (not shown) of driving the ring gears 52 and 70 is to drive them directly by a gear respectively mounted on the shafts 38 and 40 which are extended forwardly a sufficient distance so that the gears mounted thereon can engage the ring gears 52 and 70. The gear ratio for this approach is selected to produce the desired rate of rotation of the ring gears 52 and 70 in accordance with the quantity being measured.

The indicator of the illustrated embodiment of the invention has a first pointer support member 90 whose rear end is attached to the ring gear 52. The support member 90 is shaped to extend forward from the ring gear 52 and pass through the circular aperture 30 between the lamp housing 102 and the mounting plate 24 and the dial 26. At the forward end of the support member 90 is a pointer 92 which is disposed generally parallel to the dial 26 at a distance D' in front of it. When the ring gear 52 is turned, the pointer support member 90 and pointer 92 revolve about the axis 12.

The indicator has a second pointer support member 94 whose rear end is attached to the ring gear 70. The support member 94 is shaped to extend forward from the ring gear 70 and pass through the center aperture of the ring gear 52 and also through the aperture 30 between the lamp housing 102 and the mounting plate 24 and the dial 26. A second pointer 96 is mounted on the forward end of the support member 94 and is disposed substantially parallel to the dial 26 and the mounting plate 24 at a distance D in front of the dial 26. When the ring gear 70 is rotated about the axis 12, the pointer support 94 and the pointer 96 revolve about the axis 12.

In order to permit 360° excursion of each pointer 92 and 96, the pointers 92 and 96 and their respective support members 90 and 94 must be completely free to revolve about the axis 12 without striking another element of the indicator. To accomplish this, the support member 94 in the region 98 between the ring gear 70 and its forward end is disposed substantially at a distance R from the axis. In the region 100 between the ring gear 52 and the forward end of the support member 90, the support member 90 is disposed substantially at a distance R' from the axis 12. When R' is greater than R, the two support members 90 and 94 can revolve about the axis 12 when driven by synchros 32 and 34 respectively without either striking the other or any other indicator part. The pointers are prevented from striking each other by making the distance D greater than D'. As such, the support member 90 is free to move along an irregular though generally cylindrical shaped contour as the ring gear 52 is rotated while the support member 94 is free to move independently along a second irregular though generally cylindrical shaped contour nested within the first mentioned contour as the ring gear 70 is rotated.

The foregoing description has described an indicator with two independently rotatable concentric pointers disposed in front of a dial. To illuminate the pointers and the dial without obstructing view of them or interfering with movement of the pointers, the invention includes a hub lighting arrangement including an electrical lamp housing 102 which is disposed on the axis 12 and extends through the aperture 30. The lamp housing has a light shield 103 which is large enough to prevent glare from a bulb (not shown) or cluster of bulbs within the housing 102 yet small enough so as to avoid obstructing view of the dial 26. The shield 103 is easily removable to permit bulb replacement. Electrical power for the bulb (not shown) or bulbs inside the lamp housing 102 is supplied from the rear via wires 104 and 106 which are disposed generally along the axis 12 and pass through the ring gears 52 and 70. The wires 104 and 106 connect through the base plate 14 to an external source of electrical power (not shown).

The lamp housing 102 is supported on the forward end of a tubular support 108 with a portion of the housing 102 being disposed forward of the dial are to provide light directed radically outward from the housing 102 avoid obstructing visibility of the dial 26 and the pointers 92 and 96. The rear end of the tubular support is attached to the plate 16 and communicates with a through-plate aperture (not shown) permitting the wires 104 and 106 to pass therethrough. The tubular support 108 itself is disposed symmetrically about the axis 12 and passes through the central apertures of the ring gears 70 and 52 thereby avoiding contact with any of the movable indicator elements allowing them to rotate freely about the axis 12 as driven by the respective ring gear drive means.

Figure 2:
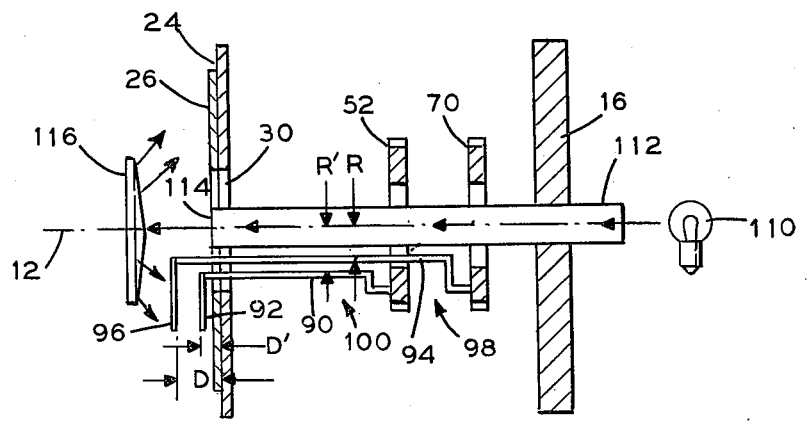

FIG. 2 shows schematically the configuration of an indicator of the type shown in FIG. 1 but including an alternative hub lighting arrangement for directing light radially outward to illuminate the dial 26 and the pointers 92 and 96. In this alternative arrangement, a bulb 110 is disposed to the rear of the central mounting plate 16. The light generated by the bulb is transmitted by a light transmitting member 112 which comprises a substantially cylindrical body disposed symmetrically about the axis 12 and extends forwardly through the central mounting plate 16, the ring gears 70 and 52 as well as through the aperture 30. The light transmitting member 112 may be a fiber optic bundle or any other suitable light transmitting medium. Disposed in front of the forward end 114 of the light transmitting member 112 is a light director 116 such as a mirror which directs the light passing through the forward end 114 toward the dial 26 to illuminate it and the pointers 92 and 96. The light director 116 is shown in exaggerated size for simplicity of the drawing. In actual practice it is disposed only slightly in front of the dial 26 and it is much smaller in size than shown in FIG. 2 so that visibility of the dial 26 and the pointers 92 and 96 is not obstructed yet they ae sufficiently illuminated to permit observing the instrument reading even when it is dark.

Those skilled in the art will recognize that other hub lighting arrangements of the type shown in FIG. 2 can be applied to indicators of the type described herein. For example, if the light transmitting member 112 is a fiber optic bundle, the ends of the bundle can be shaped in the form of an umbrella so that the light traveling in each fiber is directed toward the dial 26. As such, there is no need for a light director 116 in this alternate arrangement as the light directing is done by bending each optical fiber.

While the foregoing description of the invention has placed particular emphasis on the illustrated structure, it will be evident to those skilled in the art that numerous structural modifications in addition to those already mentioned can be made thereto without departing from the spirit and scope of the invention. Specifically, the invention is adaptable to providing hub lighting in an indicator with more than two pointers. This adaptation is accomplished by providing an additional ring gear for each desired additional pointer. Each additional pointer connects via a pointer support which is shaped to permit 360° rotation without interference with any of the other ring gear or attached pointer support member in a manner similar to that for support 94.

The illustrated embodiment of the invention has ring gears supported by bearings which engage a groove or slot in the outer surface of the ring gear. However, the rearwardmost ring gear 70 of the illustrated embodiment can be supported by bearings which engage a slot on its inner surface. A further alternative support for the ring gears is to mount the bearings for supporting each ring gear on a common bearing support member.

The illustrated embodiment of the invention also contemplates using receiver synchros and a gearing ratio between those synchros and the ring gears that permits precisely 360° rotation for each 360° rotation of the synchro rotor shaft. As already mentioned, the gearing can be different so as to provide pointer excursion which is consistent with the quantity being measured. Additionally, the drive for the ring gears may take other forms. For example, the ring gears may be replaced by a ring shaped member which is driven by a drive wheel with a friction engagement with the ring member. Other drive arrangements for rotating a ring member may also be used if so desired.

The illustrated embodiment of the invention shows two alternative hub lighting arrangements for indicators with 360° excursion of pointers. It will be readily recognized by those of skill in the art that other hub lighting arrangements with power connection from the rear along the rotation axis and through the ring gears can be utilized equally effectively.

The foregoing and other modifications of the illustrated embodiment of the invention can be made without departing from the spirit and scope of the invention as defined in the claims.

I claim:
1. A hub lighted indicator comprising:
   a dial having a central circular aperture in the face thereof;
   a ring member mounted for rotation coaxially with said aperture;
   lighting means positioned in said aperture and spaced from the edge thereof for directing light radially outward to illuminate said face of said dial;
   pointer means having an end portion extending through said aperture between said lighting means and said edge for indicating a position on said face of said dial, the other end of said pointer means being attached to said ring means;
   means for driving said ring member in accordance with the value of the quantity being indicated to cause a corresponding excursion of said end portion of said pointer means, and
   means extending through the central portion of said ring member for electrically connecting said lighting means to a source of electrical power.

2. The hub lighted indicator of claim 1 additionally including:
   a second ring member mounted for rotation coaxially with said aperture;
   a second pointer means having an end portion extending through said aperture between said lighting means and said first mentioned pointer means for indicating a second position on said face of said dial, the other end of said second pointer means being attached to said second ring member, a portion of said second pointer means intermediate said end portion and said other end extends through the central portion of said first mentioned ring member; and
   means for driving said second ring member in accordance with the quantity being indicated to cause a corresponding excursion of said end portion of said second pointer means.

3. The hub lighted indicator of claim 1 wherein said ring member comprises a ring gear.

4. The hub lighted indicator of claim 2 wherein said first mentioned ring member is a ring gear and said second ring member is a second ring gear.

5. The hub lighted indicator of claim 1 wherein said ring member has a continuous slot extending completely around said ring member, said ring member being positioned for rotation coaxially with said aperture by a plurality of bearings riding in said slot.

6. A hub lighted indicator comprising:
   a dial having a central circular aperture in the face thereof;
   a ring member mounted for rotation coaxially with said aperture;
   light transmitting means positioned in said aperture and spaced from the edge thereof for transmitting light therethrough, said light transmitting means extending through the central portion of said ring member;
   pointer means having an end portion extending through said aperture between said edge and said light transmitting means for indicating a position on said face of said dial, the other end of said pointer means being attached to said ring means;
   means for driving said ring member in accordance with the value of the quantity being indicated to cause a corresponding excursion of said end portion of said pointer means;
   means for directing light passing through said aperture inside said light transmitting means radially outward to illuminate said face of said dial; and
   means to generate light inside said light transmitting means.

7. The hub lighted indicator of claim 6 additionally including:
   a second ring member mounted for rotation coaxially with said aperture;
   a second pointer means having an end portion extending through said aperture between said light transmitting means and said first mentioned pointer means for indicating a second position on said face of said dial, the other end of said second pointer means being attached to said second ring member, a portion of said second pointer intermediate said end portion and said other end extends through the central portion of said first mentioned ring member; and
   means for driving said second ring member in accordance with a quantity being indicated to cause a corresponding excursion of said end portion of said second pointer means.

8. The hub lighted indicator of claim 6 wherein said ring member comprises a ring gear.

9. The hub lighted indicator of claim 7 wherein said first mentioned ring member is a ring gear and said second ring member is a ring gear.

10. The hub lighted indicator of claim 1 wherein said ring member has a continuous slot extending completely around said ring member, said ring member being positioned for rotation coaxially with said aperture by a plurality of bearings riding in said slot.

* * * * *